(No Model.) 5 Sheets—Sheet 1.

G. A. BOYDEN.
VALVE FOR AUTOMATIC AIR BRAKES.

No. 481,136. Patented Aug. 16, 1892.

(No Model.) 5 Sheets—Sheet 2.
G. A. BOYDEN.
VALVE FOR AUTOMATIC AIR BRAKES.

No. 481,136. Patented Aug. 16, 1892.

Witnesses:
J. P. Davis.
A. O. Rabendreier.

Inventor:
Geo. A. Boyden
By Chas. B. Mann
Atty.

(No Model.) 5 Sheets—Sheet 3.

G. A. BOYDEN.
VALVE FOR AUTOMATIC AIR BRAKES.

No. 481,136. Patented Aug. 16, 1892.

Witnesses:
J. P. Davis.
A. O. Rabendreier.

Inventor:
Geo. A. Boyden
By Chas. B. Mann
Atty.

THE NORRIS PETERS CO., PHOTO-LITHO., WASHINGTON, D. C.

(No Model.) 5 Sheets—Sheet 4.
G. A. BOYDEN.
VALVE FOR AUTOMATIC AIR BRAKES.

No. 481,136. Patented Aug. 16, 1892.

(No Model.)  5 Sheets—Sheet 5.

G. A. BOYDEN.
VALVE FOR AUTOMATIC AIR BRAKES.

No. 481,136. Patented Aug. 16, 1892.

Witnesses:
J. P. Davis.
A. O. Babendreier.

Inventor:
Geo. A. Boyden
By Chas. B. Mann
Atty.

UNITED STATES PATENT OFFICE.

GEORGE A. BOYDEN, OF BALTIMORE, MARYLAND, ASSIGNOR TO THE BOYDEN BRAKE COMPANY OF BALTIMORE CITY, OF MARYLAND.

VALVE FOR AUTOMATIC AIR-BRAKES.

SPECIFICATION forming part of Letters Patent No. 481,136, dated August 16, 1892.

Application filed February 12, 1892. Serial No. 421,237. (No model.)

*To all whom it may concern:*

Be it known that I, GEORGE A. BOYDEN, a citizen of the United States, residing at Baltimore, in the State of Maryland, have invented certain new and useful Improvements in Valves for Automatic Air-Brakes, of which the following is a specification.

This invention relates to a new and improved valve for automatic air-brakes of that class which are called "triple valves." One object of the invention is to provide for admitting air-pressure to the brake-cylinder from both the train-pipe and the auxiliary reservoir by the ordinary slide-valve of the triple valve to produce a quick application of the brakes, and thereby avoid employing an auxiliary valve.

Another object is to provide triple valves which employ slide-valves with new and improved means for graduating without the complication of additional movable parts to the slide-valve and piston, which said means shall be controlled by slight variations of pressure in the train-pipe, so that any desired degree of brake-pressure may be applied to the wheels of the cars.

Since the air-brake triple valve proper has been developed to the slide-valve form, as shown in United States patent to Westinghouse, No. 168,359, dated October 6, 1875, two additional or "auxiliary" valves have been arranged to co-operate with the said triple valve to perform additional functions in braking—to wit, that of "graduating" the brakes—a function that is illustrated in United States patent to Westinghouse, No. 220,556, dated October 14, 1879, and that of "quick action," which is to apply the brakes with greater rapidity and power by partially exhausting the train-pipe of air and discharging said air, together with auxiliary-reservoir air, into the brake-cylinders, a function that is illustrated in United States patent to Westinghouse, No. 360,070, dated March 29, 1887.

Heretofore in triple valves which employ slide-valves where the endeavor has been made to provide for quick action in emergency stop the auxiliary-reservoir air alone has passed to the brake-cylinder by the opening of the slide-valve, while the train-pipe air has passed to said cylinder by a different valve—that is, the auxiliary valve last referred to.

The first part of my present invention consists, broadly, in the combination, with a triple valve having a piston and slide-valve which is moved one way by auxiliary-reservoir-air pressure, of means whereby both train-pipe air and auxiliary-reservoir air may be admitted by the same slide-valve to the brake-cylinder for applying the brakes. By this part of my invention the air from the train-pipe may be admitted directly to the brake-cylinder without interfering with the usual operation or functions of the triple valve, and also without the aid of the auxiliary valve heretofore required for the purpose. My invention enables the triple valve alone to produce what is called "quick action" in emergency applications.

The second part of my invention consists in the combination, with a slide-valve which is operated by the movement of a piston, of a passage for auxiliary-reservoir air to preliminarily apply the brakes gradually or partially with any degree of pressure, the inlet to which passage is controlled by the said piston and the exit from the passage is controlled by the slide-valve. By this part of my invention the "graduation" or partial application of the brakes may be effected without the use of an auxiliary valve, and also without liability when closing the graduating-passage which admits auxiliary-reservoir air to the brake-cylinder to move the slide-valve to the "release position," where the brake-cylinder air will exhaust to the atmosphere, and thus unintentionally release the brakes at a time when it is desired to keep them applied.

The invention is illustrated in the accompanying drawings.

Fig. 4 is a longitudinal section of the valve-case on the line 4 4, which is transverse to that on which Fig. 2 is taken and shows the slide-valve seat.

The valve-case 5 is to be connected with the auxiliary reservoir or brake-cylinder, as desired, and secured at any suitable place, so that the passages A to the piston-chamber will communicate with said reservoir and the passage $g'$ from the valve-chamber will communicate with the brake-cylinder. The nozzle 1 is to be connected with the train-pipe, the exhaust-passage G opens to the atmosphere, and the port $i$ in the valve-chamber is the inner end of this exhaust-passage. The valve-case is provided with an ordinary drip-chamber E to receive the water of condensation, and the water may be drawn therefrom by removing a plug 4. The piston-chamber D, valve-chamber C, piston 29 and attached stem $g^2$, the slide-valve H, and spring $n$, which holds the said valve to its seat, are all relatively arranged substantially like those parts in triple valves heretofore made.

The first part of my invention will now be described.

Referring to the drawings Figs. 2 to 9, one side of the piston 29 is provided with a conical projection or face $a$, which stops against the end of the bushing $b$ of the valve-chamber C. Extending from this side of the piston is the stem $g^2$, which projects into the valve-chamber and moves the slide-valve H. A passage F leads from the train-pipe nozzle to the piston 29, and a continuation F' of this passage leads around the piston-chamber D to the far or right-hand end of the said bushing $b$. A check-valve 26 is located at some suitable point in this passage and a spring 27 holds it normally to its seat 28. A cap-nut 30 serves as a guide for the stem of the check-valve and also confines it. By removing the cap-nut the check-valve may be withdrawn. The piston-stem $g^2$ carries a head or partition 9, which fits snugly and moves in the valve-chamber bushing $b$. In Figs. 2, 8, 9, and 10 this partition is shown located on the end of the stem and acts on the end of the slide-valve when the piston moves outward or to the left. When the piston has completed its full stroke to the left—the emergency-stop position, (see Fig. 10,)—the brake-cylinder port $c$ is wide open and the partition 9 serves to retard or restrict the auxiliary-reservoir air in its transmission to the said port. At the moment the brakes are being applied for an emergency stop the partition has the effect to confine on the auxiliary-reservoir side of the piston a greater pressure than that of the air passing through the brake-cylinder port, as hereinafter explained. A restricted or small passage B through the partition 9 serves as an air communication between opposite sides thereof. A feeding-groove $a'$ is formed on the conical face of the piston 29. Passages A are formed in the case around the valve-chamber and constitute a direct communication between the auxiliary reservoir and the piston-chamber D and without passing through the valve-chamber C. In the present instance six passages A are shown, the combined area or capacity of which affords an ample supply of auxiliary-reservoir air for emergency applications. If desired, the number of these passages may be varied. One passage will serve the purpose as well if it is large enough. The cap 3 is secured to the valve-body 5 by suitable bolts. By taking off this cap all the movable parts of the valve, including those which produce quick action, may be withdrawn for inspection or repair. The communication between the train-pipe nozzle 1 and the auxiliary reservoir for charging the same with compressed air is by way of the passages F F', restricted passage B, valve-chamber C, groove $a'$, piston-chamber D, and the passages A. Communication between the train-pipe nozzle 1 and the brake-cylinder direct to produce quick action in emergency stops is by way of the passages F F', slide-valve port $c$, and passage $g'$. Communication between the auxiliary reservoir and brake-cylinder for ordinary full application of the brakes, also for quick-action, (not including graduating, however,) is by way of the passages A, piston-chamber D, valve-chamber C, restricted passage B, slide-valve port $c$, and passage $g'$. Communication between the brake-cylinder and atmosphere to release the brakes is by way of the passage $g'$, slide-valve port $c$, the cavity $j$ in the slide-valve, the port $i$ in the seat of the slide-valve, and the exhaust-passage G.

It will be seen by the foregoing that a novel feature of this part of my invention is that one and the same slide-valve H here serves three purposes, to wit: first, quick action in applying the brakes for emergency stops by the passage of train-pipe air to the brake-cylinder in conjunction with auxiliary-reservoir air; second, ordinary full application of the brakes by the passage of auxiliary-reservoir air alone to the brake-cylinder, and, third, the release of the brakes.

The second part of the invention—to wit, the improved means for gradually applying the brakes—will now be described.

A passage $e$ to admit auxiliary-reservoir air to produce a graduated application of the brakes is in the valve-case and leads from the piston-chamber D to the seat of the slide-valve, where its exit-port $e^2$ opens through the bushing $b$ to said seat. The slide-valve H is provided with a cavity $j$, and its face has two openings in the form of cross-slots $j'$ $j^2$, one opening being at each end of said cavity, which serve to complete the communication between the exit-port of said graduating-passage and the slide-valve port $c$, leading to the brake-cylinder. The piston 29 opens and closes the inlet-port $e'$ of the graduating-passage, so that auxiliary-reservoir air may enter the said passage and flow to the brake-cylinder as soon as the opening $j^2$ of the slide-valve cavity registers with the exit-port $e^2$, and thereby establishes communication between the said passage $e$ and the main port $c$. The passage from the auxiliary reservoir to the brake-cylinder for graduating is as follows: by way of the passage A, piston-chamber D, passage $e$, cavity $j$ in the slide-valve, and passage $g'$. The piston 29 is provided on the train-pipe side with a yielding stem or knob $t$, which comes in contact with a plate $u$ to check or retard the movement of the piston when graduating. The knob-stem $t$ fits telescopically through the piston and into its stem $g^2$, and a spiral spring $v$ serves to keep the knob-stem projected with a certain degree of tension.

Figure 1:
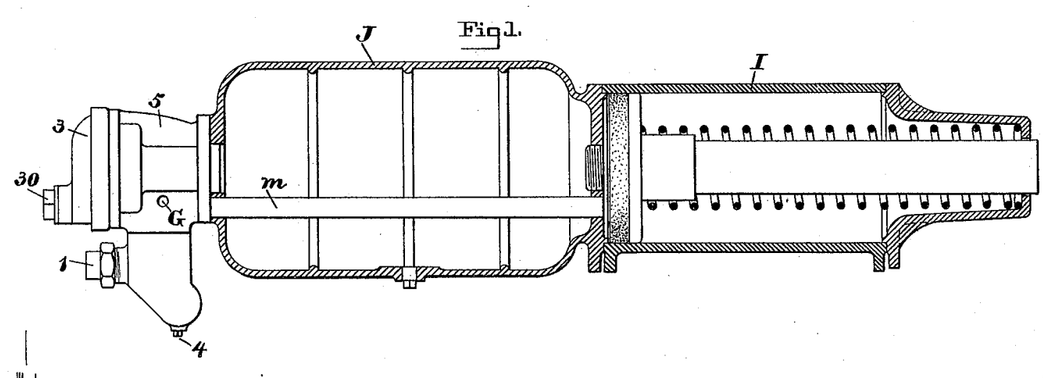
Figure 1 shows an auxiliary reservoir and brake-cylinder in section and a side view of my improved valve and illustrates one way of attaching the said valve.
Figure 2:
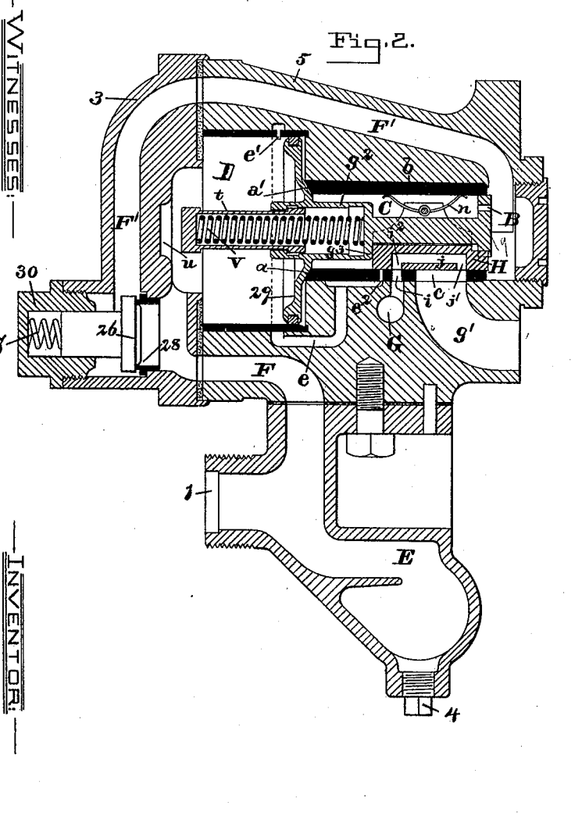
Fig. 2 is a longitudinal section of the improved valve on the line 2 2, showing all the parts, the slide-valve being in the release position.
Figure 3:
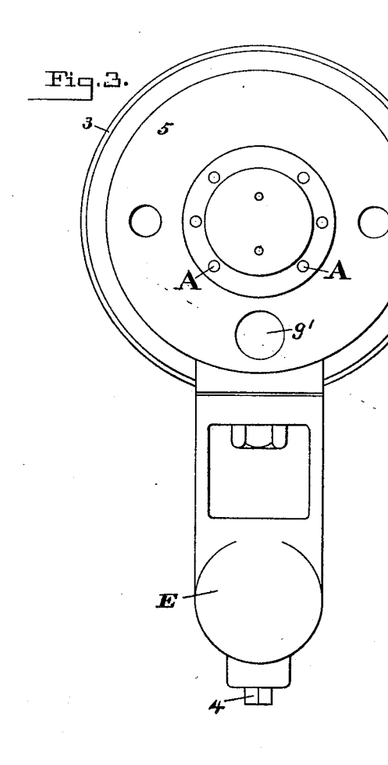
Fig. 3 is a view of the valve-case at that end which is to be secured to the auxiliary reservoir.
Figure 4:
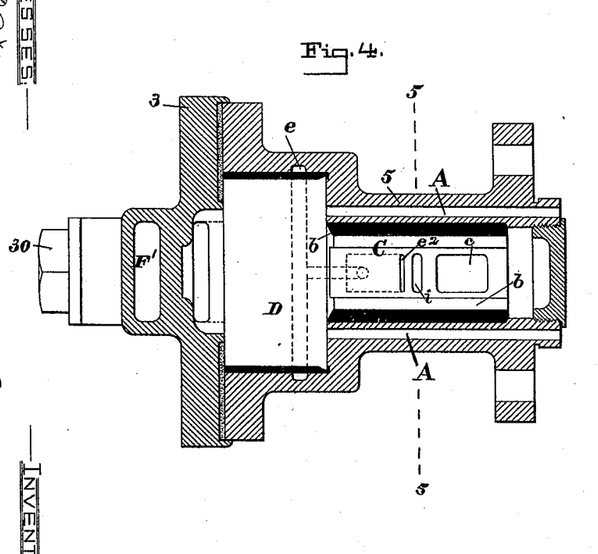
Figure 5:
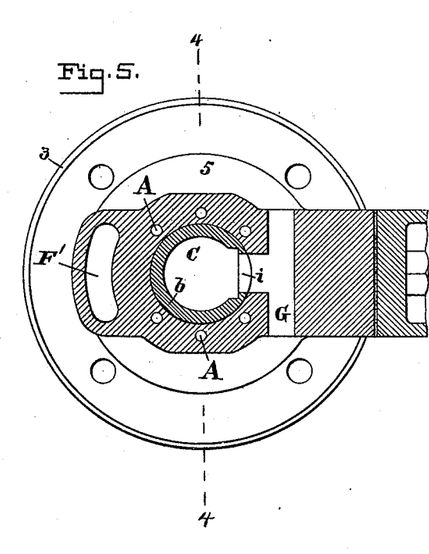
Fig. 5 is a cross-section of the valve-case on the line 5 5.
Figures 6, 7, 8, 9, 10, 11:
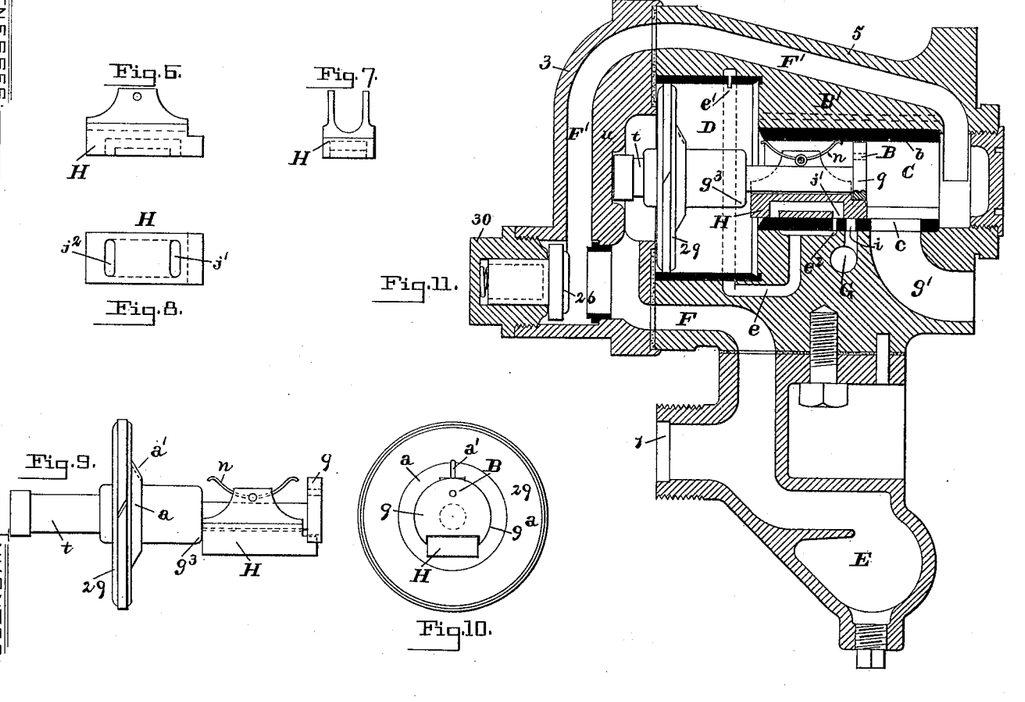
Figs. 6, 7, and 8 are views of the slide-valve.
Fig. 9 is a view of the piston, the parts which are rigidly connected with it, and the slide-valve, these composing all the parts which are removable from the body of the case for inspection or cleaning.
Fig. 10 is an end view of the partition, slide-valve, and piston.
Fig. 11 is a section of the complete valve, showing the piston, slide-valve, and check-valve in the emergency-stop position and while the train-pipe air is flowing to the brake-cylinder.

The operation of my improved valve is as follows: To charge the auxiliary reservoir, the air from the train-pipe entering at the nozzle 1 passes through the passage F to the piston 29 and moves it to the position shown in Fig. 2, where the release-port is open. The air, continuing, opens the check-valve 26 to the passage F' and passes to the partition 9, then through the small passage B to the valve-chamber C, through groove $a'$ to the piston-chamber D, and then through the passages A to the auxiliary reservoir. The brakes may be applied fully in two ways: first, by the auxiliary-reservoir pressure alone, and, second, by the auxiliary-reservoir pressure in conjunction with the train-pipe pressure. The first mode may be used when an ordinary gradual stop is required, such as at a station. The second mode produces quick action and is used when an emergency stop is required, such as upon the occurrence of an accident. To apply the brakes fully by auxiliary-reservoir-air pressure alone, the engineer's valve is turned to gradually and continuously discharge air from the train-pipe. This particular manner of discharging air at the engineer's valve will slowly move the piston 29 and slide-valve H until they reach their full stroke to the left and open port $c$; but in making this slow movement the air from the train-pipe will not pass to the brake-cylinder, because there will be time sufficient for auxiliary-reservoir air to pass the restricted passage B and accumulate in the passage $g'$ and in the brake-cylinder and by accumulating there prevent the pressure in the valve-chamber on the right-hand side of the partition and in the passage F' from becoming reduced to such degree as will allow the diminishing train-pipe pressure to unseat the check-valve 26, and thereby prevent the passage of the train-pipe air to the brake-cylinder. Thus it will be seen that a gradual and continuous reduction of train-pipe pressure at the engineer's valve, as stated, will afford time for the air-pressure, which has been disturbed or slightly unbalanced in the several chambers and passages of the valve-case, to become readjusted and equalized and thereby prevent such a diminution of pressure on the valve-chamber side of the check-valve 26 as will cause the latter to unseat. In this way the parts of the valve device which are comprised in what I have termed the "first part" of this invention accomplish one of the ordinary functions of triple valves in applying the brakes fully by auxiliary-reservoir-air pressure alone. To apply the brakes fully by quick action for an emergency stop, the train-pipe pressure is suddenly reduced by discharging at the engineer's valve, say, about twenty pounds, which quickly moves the piston 29 and its attached parts their full stroke to the left. This will move the slide-valve H and open the port $c$ and close the release-port $i$. By thus suddenly and fully opening the main port $c$ a passage is opened from the train-pipe direct to the brake-cylinder, through which air from the train-pipe will pass. This passage is as follows: from the nozzle 1 through the passage F, the check-valve 26, and passage F', and as the slide-valve H has been quickly moved to its full open position the condition of pressure will be favorable, as hereinafter explained, and the air will pass through this valve-port $c$ directly from the train-pipe to the brake-cylinder. This operation of the valve is due to the co-action of three momentary differential pressures immediately after the piston 29 has suddenly moved its full stroke to the left. These pressures approximately are seventy pounds from the auxiliary reservoir acting on the piston 29 and holding it to the extreme end of its stroke; fifty pounds in the train-pipe and at opposite side of piston, due to the twenty pounds reduction by the aforesaid discharge at the engineer's valve, and, say, five pounds in the valve-chamber (see Fig. 11) on the right-hand side of the partition in the passage F' and on one side of the check-valve 26, due to the sudden air-discharge therefrom through the wide-open port $c$ and to the fact that the auxiliary-reservoir-air supply thereto is restricted through the small passage B. In this operation the fifty pounds pressure on the train-pipe side of the check-valve unseats the latter and passes through the passage F', the open port $c$, and passage $g'$ into the brake-cylinder, thereby performing two functions in quick action—to wit, partially emptying the train-pipe, which quickens the action of the triple valve on the brakes of the following car, and partially charging the brake-cylinder with the train-pipe air, which augments the pressure applied to the wheels of the car. After the air-pressures in the train-pipe and brake-cylinder have equalized auxiliary-reservoir air will continue to pass through the said open port $c$ to the brake-cylinder, coming by way of the passages A, piston-chamber D, valve-chamber C, and restricted passage B, until there is an equalization of air-pressure in both said reservoir and cylinder. It will thus be seen that the piston which actuates the slide-valve is moved in one direction by auxiliary-reservoir pressure and that air may be passed through the said slide-valve port $c$ to the brake-cylinder from both the train-pipe and the auxiliary reservoir to produce quick action for an emergency application of the brakes, and thereby I avoid the employment of an auxiliary valve. The quick-action function does not follow when the port $c$ leading to the brake-cylinder is opened slowly and gradually, because then the pressure adjoining the partition 9 on the right-hand side is not reduced materially below the train-pipe pressure. On the other hand, the quick action will follow when said port $c$ is opened suddenly and fully, because then the pressure at said location will be reduced sufficiently below the train-pipe pressure for the latter to unseat the check-valve and pass through the right-hand end of the triple-valve chamber to the brake-cylinder. The sudden movement of the slide-valve uncovers the main port $c$, leading to the brake-cylinder; but the flow of the higher-pressure air from the auxiliary reservoir into the brake-cylinder is retarded by being compelled to traverse a relatively small passage (in the present instance at the partition) while the flow of the lower-pressure train-pipe air into the brake-cylinder is facilitated by permitting it to traverse a much larger passage. Therefore the same valve-port $c$ allows a considerable volume of train-pipe air to flow into the brake-cylinder, notwithstanding the admission through the same port at the same time of the auxiliary-reservoir air under a higher pressure. To release the brakes, a sufficient amount of air is admitted from the main reservoir, which is on the locomotive, to the train-pipe to overcome the resistance of the auxiliary-reservoir pressure and the friction of the slide-valve H and move the piston 29 and said valve toward the right hand to the position shown in Fig. 2, and thereby establish communication between the brake-cylinder and atmosphere by way of the passage $g'$, cavity $j$, release-port $i$, and exhaust G. In addition to the said quick-action result obtained by the construction and combination of parts comprising the first part of my invention another useful result or advantage is gained, to wit: Should the piston and slide-valve "stick" by reason of the accumulation of dirt or of gum formed by the oil and fail to move forward when compressed air is first applied to the brake-pipe before the train starts out, then under such circumstances the brakes would be applied by the train-pipe air passing directly to the brake-cylinder, and thereby indicate to the trainmen the defective condition of the brakes. To partially apply the brakes by graduation, either to check the speed of the train or to gradually stop, the train-pipe pressure is reduced slightly but sufficiently to move the piston and slide-valve H to a position that will put the second opening $j^2$ of the cavity of the valve in connection with the exit-port $e^2$ of the graduating-passage and cause the piston to open the inlet-port $e'$ of said passage to the auxiliary-reservoir air. The train-pipe pressure must not be reduced enough to enable the greater auxiliary reservoir pressure acting on the piston to overcome the tension of the spring $v$. This movement of the piston and slide-valve to the left allows auxiliary-reservoir air to continue passing through the graduating-passage $e$ to the brake-cylinder until the pressure on the auxiliary-reservoir side of the piston has been reduced below that which is on its train-pipe side, whereupon the train-pipe pressure will move the piston 29 (but not the slide-valve) partly back to the right until the piston-ring packing closes the inlet-port $e'$, which by cutting off the flow of auxiliary-reservoir air will so retard the back movement of the piston that the shoulder $g^3$ of the stem will abut the slide-valve easily. There is sufficient play between the shoulder $g^3$ and the partition 9 to permit a movement of the piston independent of any movement of the slide-valve H. When the piston-shoulder $g^3$ abuts easily, as stated, against the end of the slide-valve, the resistance of the latter will stop the piston with its packing-ring over the said inlet-port $e'$ for the time being and prevent any more air passing through the graduating-passage $e$. An advantage resulting from this graduating operation is that when enough air has been entered into the brake-cylinder to effect the desired partial application of the brakes the flow of air through the graduating-passage $e$ is cut off by the piston packing-ring, which prevents the slide-valve being abutted as severely as in devices heretofore employed. Consequently in thus first cutting off the said air-flow there is no liability to move the slide-valve to the release position and unintentionally release the brakes. Thus the graduation is effected by the slide-valve and without the use of an auxiliary valve. The restricted passage B for the supply of auxiliary-reservoir air when applying the brakes for emergency stops is shown in Figs. 2 and 10, for the purpose of clear illustration, as a small hole through the partition 9; but a special hole or passage is not necessary, as the partition 9 may fit the bushing $b$ loosely enough to leave a small space between the rim $9^a$ of the partition and the wall of the bushing. Such looseness of fit or A passage $e$ to admit auxiliary-reservoir air to produce a graduated application of the brakes is in the valve-case and leads from the piston-chamber D to the seat of the slide-valve, where its exit-port $e^2$ opens through the bushing $b$ to said seat. The slide-valve H is provided with a cavity $j$, and its face has two openings in the form of cross-slots $j'$ $j^2$, one opening being at each end of said cavity, which serve to complete the communication between the exit-port of said graduating-passage and the slide-valve port $c$, leading to the brake-cylinder. The piston 29 opens and closes the inlet-port $e'$ of the graduating-passage, so that auxiliary-reservoir air may enter the said passage and flow to the brake-cylinder as soon as the opening $j^2$ of the slide-valve cavity registers with the exit-port $e^2$, and thereby establishes communication between the said passage $e$ and the main port $c$. The passage from the auxiliary reservoir to the brake-cylinder for graduating is as follows: by way of the passage A, piston-chamber D, passage $e$, cavity $j$ in the slide-valve, and passage $g'$. The piston 29 is provided on the train-pipe side with a yielding stem or knob $t$, which comes in contact with a plate $u$ to check or retard the movement of the piston when graduating. The knob-stem $t$ fits telescopically through the piston and into its stem $g^2$, and a spiral spring $v$ serves to keep the knob-stem projected with a certain degree of tension.

Figures 12, 13:
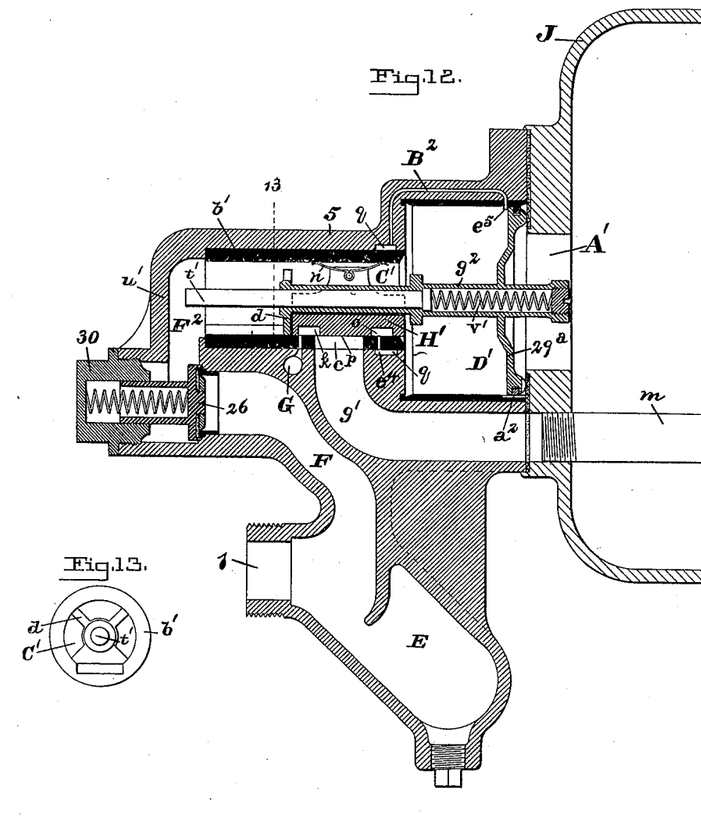
Fig. 12 shows a modification in the structural features of the valve-case and in the organization of the parts, but which employs a slide-valve, as in Fig. 2, and has the same mode of operation as the structure there shown.
Fig. 13 shows a cross-section of the valve-chamber seen in Fig. 12 on the line 13 13.

The operation of my improved valve is as follows: To charge the auxiliary reservoir, the air from the train-pipe entering at the nozzle 1 passes through the passage F to the piston 29 and moves it to the position shown in Fig. 2, where the release-port is open. The air, continuing, opens the check-valve 26 to the passage F' and passes to the partition 9, then through the small passage B to the valve-chamber C, through groove $a'$ to the piston-chamber D, and then through the passages A to the auxiliary reservoir. The brakes may be applied fully in two ways: first, by the auxiliary-reservoir pressure alone, and, second, by the auxiliary-reservoir pressure in conjunction with the train-pipe pressure. The first mode may be used when an ordinary gradual stop is required, such as at a station. The second mode produces quick action and is used when an emergency stop is required, such as upon the occurrence of an accident. To apply the brakes fully by auxiliary-reservoir-air pressure alone, the engineer's valve is turned to gradually and continuously discharge air from the train-pipe. This particular manner of discharging air at the engineer's valve will slowly move the piston 29 and slide-valve H until they reach their full stroke to the left and open port $c$; but in making this slow movement the air from the train-pipe will not pass to the brake-cylinder, because there will be time sufficient for auxiliary-reservoir air to pass the restricted passage B and accumulate in the passage $g'$ and in the brake-cylinder and by accumulating there prevent the pressure in the valve-chamber on the right-hand side of the partition and in the passage F' from becoming reduced to such degree as will allow the diminishing train-pipe pressure to unseat the check-valve 26, and thereby prevent the passage of the train-pipe air to the brake-cylinder. Thus it will be seen that a gradual and continuous reduction of train-pipe pressure at the engineer's valve, as stated, will afford time for the air-pressure, which has been disturbed or slightly unbalanced in the several chambers and passages of the valve-case, to become readjusted and equalized and thereby prevent such a diminution of pressure on the valve-chamber side of the check-valve 26 as will cause the latter to unseat. In this way the parts of the valve device which are comprised in what I have termed the "first part" of this invention accomplish one of the ordinary functions of triple valves in applying the brakes fully by auxiliary-reservoir-air pressure alone. To apply the brakes fully by quick action for an emergency stop, the train-pipe pressure is suddenly reduced by discharging at the engineer's valve, say, about twenty pounds, which quickly moves the piston 29 and its attached parts their full stroke to the left. This will move the slide-valve H and open the port $c$ and close the release-port $i$. By thus suddenly and fully opening the main port $c$ a passage is opened from the train-pipe direct to the brake-cylinder, through which air from the train-pipe will pass. This passage is as follows: from the nozzle 1 through the passage F, the check-valve 26, and passage F', and as the slide-valve H has been quickly moved to its full open position the condition of pressure will be favorable, as hereinafter explained, and the air will pass through this valve-port $c$ directly from the train-pipe to the brake-cylinder. This operation of the valve is due to the co-action of three momentary differential pressures immediately after the piston 29 has suddenly moved its full stroke to the left. These pressures approximately are seventy pounds from the auxiliary reservoir acting on the piston 29 and holding it to the extreme end of its stroke; fifty pounds in the train-pipe and at opposite side of piston, due to the twenty pounds reduction by the aforesaid discharge at the engineer's valve, and, say, five pounds in the valve-chamber (see Fig. 11) on the right-hand side of the partition in the passage F' and on one side of the check-valve 26, due to the sudden air-discharge therefrom through the wide-open port $c$ and to the fact that the auxiliary-reservoir-air supply thereto is restricted through the small passage B. In this operation the fifty pounds pressure on the train-pipe side of the check-valve unseats the latter and passes through the passage F', the open port $c$, and passage $g'$ into the brake-cylinder, thereby performing two functions in quick action—to wit, partially emptying the train-pipe, which quickens the action of the triple valve on the brakes of the following car, and partially charging the brake-cylinder with the train-pipe air, which augments the pressure applied to the wheels of the car. After the air-pressures in the train-pipe and brake-cylinder have equalized auxiliary-reservoir air will continue to pass through the said open port $c$ to the brake-cylinder, coming by way of the passages A, piston-chamber D, valve-chamber C, and restricted passage B, until there is an equalization of air-pressure in both said reservoir and cylinder. It will thus be seen that the piston which actuates the slide-valve is moved in one direction by auxiliary-reservoir pressure and that air may be passed through the said slide-valve port $c$ to the brake-cylinder from both the train-pipe and the auxiliary reservoir to produce quick action for an emergency application of the brakes, and thereby I avoid the employment of an auxiliary valve. The quick-action function does not follow when the port $c$ leading to the brake-cylinder is opened slowly and gradually, because then the pressure adjoining the partition 9 on the right-hand side is not reduced materially below the train-pipe pressure. On the other hand, the quick action will follow when said port $c$ is opened suddenly and fully, because then the pressure at said location will be reduced sufficiently below the train-pipe pressure for the latter to unseat the check-valve and pass through the right-hand end of the triple-valve chamber to the brake-cylinder. The sudden movement of the slide-valve uncovers the main port $c$, leading to the brake-cylinder; but the flow of the higher-pressure air from the auxiliary reservoir into the brake-cylinder is retarded by being compelled to traverse a relatively small passage (in the present instance at the partition) while the flow of the lower-pressure train-pipe air into the brake-cylinder is facilitated by permitting it to traverse a much larger passage. Therefore the same valve-port $c$ allows a considerable volume of train-pipe air to flow into the brake-cylinder, notwithstanding the admission through the same port at the same time of the auxiliary-reservoir air under a higher pressure. To release the brakes, a sufficient amount of air is admitted from the main reservoir, which is on the locomotive, to the train-pipe to overcome the resistance of the auxiliary-reservoir pressure and the friction of the slide-valve H and move the piston 29 and said valve toward the right hand to the position shown in Fig. 2, and thereby establish communication between the brake-cylinder and atmosphere by way of the passage $g'$, cavity $j$, release-port $i$, and exhaust G. In addition to the said quick-action result obtained by the construction and combination of parts comprising the first part of my invention another useful result or advantage is gained, to wit: Should the piston and slide-valve "stick" by reason of the accumulation of dirt or of gum formed by the oil and fail to move forward when compressed air is first applied to the brake-pipe before the train starts out, then under such circumstances the brakes would be applied by the train-pipe air passing directly to the brake-cylinder, and thereby indicate to the trainmen the defective condition of the brakes. To partially apply the brakes by graduation, either to check the speed of the train or to gradually stop, the train-pipe pressure is reduced slightly but sufficiently to move the piston and slide-valve H to a position that will put the second opening $j^2$ of the cavity of the valve in connection with the exit-port $e^2$ of the graduating-passage and cause the piston to open the inlet-port $e'$ of said passage to the auxiliary-reservoir air. The train-pipe pressure must not be reduced enough to enable the greater auxiliary reservoir pressure acting on the piston to overcome the tension of the spring $v$. This movement of the piston and slide-valve to the left allows auxiliary-reservoir air to continue passing through the graduating-passage $e$ to the brake-cylinder until the pressure on the auxiliary-reservoir side of the piston has been reduced below that which is on its train-pipe side, whereupon the train-pipe pressure will move the piston 29 (but not the slide-valve) partly back to the right until the piston-ring packing closes the inlet-port $e'$, which by cutting off the flow of auxiliary-reservoir air will so retard the back movement of the piston that the shoulder $g^3$ of the stem will abut the slide-valve easily. There is sufficient play between the shoulder $g^3$ and the partition 9 to permit a movement of the piston independent of any movement of the slide-valve H. When the piston-shoulder $g^3$ abuts easily, as stated, against the end of the slide-valve, the resistance of the latter will stop the piston with its packing-ring over the said inlet-port $e'$ for the time being and prevent any more air passing through the graduating-passage $e$. An advantage resulting from this graduating operation is that when enough air has been entered into the brake-cylinder to effect the desired partial application of the brakes the flow of air through the graduating-passage $e$ is cut off by the piston packing-ring, which prevents the slide-valve being abutted as severely as in devices heretofore employed. Consequently in thus first cutting off the said air-flow there is no liability to move the slide-valve to the release position and unintentionally release the brakes. Thus the graduation is effected by the slide-valve and without the use of an auxiliary valve. The restricted passage B for the supply of auxiliary-reservoir air when applying the brakes for emergency stops is shown in Figs. 2 and 10, for the purpose of clear illustration, as a small hole through the partition 9; but a special hole or passage is not necessary, as the partition 9 may fit the bushing $b$ loosely enough to leave a small space between the rim $9^a$ of the partition and the wall of the bushing. Such looseness of fit or the space formed thereby may constitute the restricted passage, and I have used valves constructed in this manner. The restricted passage may also be formed as a distinct channel in the case, as at B' in Fig. 11 or as at B² in 12. The partition may be located differently from what is shown in Figs. 2 and 11. It is obvious it may be anywhere on the stem $g^2$, so that it is not withdrawn from the bushing when the piston completes its stroke to the left. It may also be stated that the piston itself may under certain conditions be made to serve as a partition. This is illustrated in Fig. 12.
Fig. 12 illustrates a modification in the construction and arrangement of the parts of a valve embodying my invention. This form of valve, although differently organized from that shown in Figs. 2 to 11, inclusive, has the same parts or their equivalents and has the same mode of operation and produces the same result. The valve shown in Fig. 12 differs from that shown in the other figures chiefly in that the slide-valve of Fig. 12 is located on the train-pipe side of the actuating-piston, whereas in the other figures it is located on the auxiliary-reservoir side of said piston. Referring to Fig. 12, the valve-case 5 is connected with the auxiliary reservoir J and a communication A' opens at one end of said reservoir direct to one side of the piston $29^a$ and without passing through the valve-chamber C'. The passage $g'$ leads from the valve-chamber to the brake-cylinder I through a pipe $m$. The nozzle 1 connects with the train-pipe, the exhaust-passage G opens to the atmosphere, and the port $i$ through the valve-seat connects with said exhaust-passage. The piston $29^a$, stem $g^2$, head $d$, slide-valve H', and spring $n$ are all substantially like the same parts in Fig. 2. The check-valve 26 is located in the train-pipe passage F, as in the other figures. The relative positions of the piston and slide-valve in the valve-case are reversed in Fig. 12 from what they are in Fig. 2, and a feed-groove $a^2$ is in the bushing of the piston-chamber D'. The piston $29^a$ in this modification serves the same functions as the piston 29 in Fig. 2; but it here serves also a function ascribed to the partition 9 in Fig. 2, namely: At the moment when the brakes are being applied for an emergency stop the piston has the effect to confine on its auxiliary-reservoir side a greater pressure than that of the air passing through the brake-cylinder port $c$. This last function results from the location of the piston on the auxiliary-reservoir side of the slide-valve and the combination therewith of an ample or large passage F F² for train-pipe air and a restricted or small passage B² for the supply of auxiliary-reservoir air when applying the brakes for emergency stops. This restricted passage B² has its inlet $e^5$ in the piston-chamber and its exit in an annular groove $q$ around the valve-chamber. In this instance the passage from the train-pipe nozzle for charging the auxiliary reservoir and to the brake-cylinder to produce quick action in emergency stops is through the valve-chamber C' and past the back of the slide-valve H'. The piston-stem $g^2$ is tubular and on the train-pipe side has a yielding stem $t'$, which fits and moves telescopically into the piston-stem, and a spiral spring $v'$ keeps the yielding stem normally projected. The end of the yielding stem $t'$ comes in contact with a plate $u'$ and retards the movement of the piston when graduating. The slide-valve H' in this case has two cavities $k$ $o$ and a central face $p$ between them. One cavity $k$ connects the brake-cylinder passage $g'$ with the release-port $i$ and the other cavity $o$ connects with a port $e^4$ in the slide-valve seat, which port communicates with the restricted passage B² by way of the annular groove $q$ in the case, which groove is covered by the bushing $b'$. To charge the auxiliary reservoir, Fig. 13, train-pipe air passes through passage F F², valve-chamber C', piston-chamber D', and feed-groove $a^2$. To apply the brakes fully by auxiliary-reservoir pressure alone, the piston $29^a$ moves slowly to the left and then air passes from the auxiliary reservoir J through the port $e^5$, restricted passage B², annular groove $q$, port $e^4$ in the slide-valve seat, and passage $g'$ to the brake-cylinder. This will continue until the full power of the auxiliary-reservoir air is exerted in the brake-cylinder. To apply the brakes fully by quick action for an emergency stop, the piston $29^a$ must be moved quickly to the left, and thus suddenly open the main port $c$. The air-pressure in the valve-chamber C' between the piston and the check-valve will at once discharge through the passage $g'$ into the brake-cylinder, which will reduce the pressure at said location below the train-pipe pressure. Thereupon the check-valve 26 will unseat and train-pipe air will pass freely to the brake-cylinder by way of the passage F F² back of the slide-valve H' through the port $c$ and passage $g'$. At the same time the auxiliary-reservoir air at higher pressure than the said train-pipe air will also pass to the brake-cylinder through the restricted or small passage B², annular groove $q$, port $e^4$, port $c$, and passage $g'$. Thus in applying for emergency air passes to the brake-cylinder through the same port from both the train-pipe and the auxiliary reservoir. To release the brakes, the piston $29^a$ is moved toward the right hand to the position shown in Fig. 12, where the cavity $k$ in the slide-valve connects the passage $g'$ with the release-port $i$, and thus establishes communication from the brake-cylinder to the atmosphere. To partially apply the brakes by graduation, the piston $29^a$ will be moved from the position shown in Fig. 12 toward the left far enough to open the inlet-port $e^5$ to the auxiliary-reservoir air, and also put the cavity $o$ of the slide-valve in connection with the port $e^4$, and also the passage $g'$, leading to the brake-cylinder. In graduation the piston $29^a$ is kept in this position but a moment, and then moves toward the right hand and covers the inlet-port $e^5$, and thereby stops the flow of auxiliary-reservoir air to the brake-cylinder. It will thus be seen the passage $B^2$ in this modification serves to transmit auxiliary-reservoir air to the brake-cylinder in a restricted manner when applying for emergency stops, and also to transmit such air when graduating.

It will be seen that no auxiliary valve is employed and that a single slide-valve controls the compressed air in the several actions which the apparatus is designed to perform—to wit, applying the brakes by the full power of auxiliary-reservoir pressure alone, releasing the brakes, applying the brakes on the so-called "quick-action" plan—i. e., by train-pipe pressure in conjunction with auxiliary-reservoir pressure—and partially or wholly applying the brakes by graduating. It will also be seen that while I have provided for the said quick-action result to be effected by a single slide-valve alone and without an auxiliary valve, yet this feature of my invention may be worked or employed in connection with graduating devices of different structure from that here shown.

It is to be understood that various of the structural features here shown or described and the form and location of the ports and passages may be changed or varied without departing from my invention.

Having thus described my invention, what I claim as new, and desire to secure by Letters Patent, is—

1. The combination, in valve mechanism for automatic air-brakes, of a port through which air passes to the brake-cylinder from both the train-pipe and auxiliary reservoir to produce quick action, a port leading to the atmosphere to exhaust the air from the brake-cylinder, a single slide-valve to control the said ports, and a piston which actuates the slide-valve and is moved in one direction by auxiliary-reservoir pressure and in the opposite direction by train-pipe pressure.

2. The combination, in valve mechanism for automatic air-brakes, of a piston actuated in one direction by auxiliary-reservoir pressure and in the opposite direction by train-pipe pressure, and a single slide-valve controlling the passage of air to the brake-cylinder from both the train-pipe and auxiliary reservoir for an emergency application of the brake.

3. The combination, in valve mechanism for automatic air-brakes, of a piston-chamber, a piston, a valve-chamber having a port through which air passes to the brake-cylinder from both the auxiliary reservoir and train-pipe, a slide-valve controlling said port, and a partition which at the time of applying the brakes separates the auxiliary-reservoir-air pressure that is on the said piston from the pressure in that part of the valve-chamber that is adjacent to the said port.

4. The combination, in valve mechanism for automatic air-brakes, of a valve-chamber, a slide-valve therein controlling the exhaust of air from the brake-cylinder to the atmosphere, and also the passage of air to the brake-cylinder from both the train-pipe and the auxiliary reservoir, a piston-chamber, and a piston to actuate the said slide-valve and carrying a partition arranged to retard or restrict the auxiliary-reservoir air in its transmission to the port of the said slide-valve.

5. The combination, in valve mechanism for automatic air-brakes, of a port through which air passes from both the auxiliary reservoir and train-pipe to the brake-cylinder, a port leading to the atmosphere, a passage for auxiliary-reservoir air to pass to said brake-cylinder port, a passage having a greater area than the first-mentioned passage to admit train-pipe air to said brake-cylinder port, a slide-valve to control said ports, and a check-valve located in the said train-pipe passage.

6. The combination, in valve mechanism for automatic air-brakes, of a piston-chamber, a piston, a valve-chamber having a port leading to the atmosphere and also a port leading to the brake-cylinder, a slide-valve controlling the said ports, a communication for auxiliary-reservoir air direct to one side of the said piston without passing through the valve-chamber, and a restricted communication for auxiliary-reservoir air to pass to said brake-cylinder port.

7. The combination, in valve mechanism for automatic air-brakes, of a valve-port through which air passes to the brake-cylinder from both the auxiliary reservoir and direct from the train-pipe, an exhaust-port, a slide-valve to control the said port, a piston, and communications relatively proportioned to produce on the auxiliary-reservoir side of the piston a greater pressure than that of the said air passing through the brake-cylinder port.

8. The combination, in valve mechanism for automatic air-brakes, of a slide-valve seat having a port which is in communication with the brake-cylinder, a passage through which train-pipe pressure is transmitted to the said brake-cylinder port when applying the brakes for emergency stops, a passage of more restricted capacity than said train-pipe passage and through which auxiliary-reservoir pressure also is transmitted to the said brake-cylinder port when applying the brakes for emergency stops, and a slide-valve resting on said seat and coacting with said port and controlling the passage to the brake-cylinder of both the train-pipe and auxiliary-reservoir pressure, as set forth.

9. The combination, in valve mechanism for automatic air-brakes, of a slide-valve, a piston which actuates the said slide-valve, and a graduating-passage for auxiliary-reservoir pressure to preliminarily apply the brakes, the exit from which passage is controlled by the said slide-valve and the inlet thereto by the said piston and which passage admits auxiliary-reservoir pressure to the brake-cylinder when open at both of said controlled places.

10. The combination, in valve mechanism for automatic air-brakes, of a slide-valve seat having a port which is in communication with the brake-cylinder, a passage leading to the said slide-valve seat and through which auxiliary-reservoir pressure is transmitted for graduating the brakes, a passage through which train-pipe pressure is transmitted to the said brake-cylinder port when applying the brakes for emergency stops, a passage of more restricted capacity than said train-pipe passage and through which auxiliary-reservoir pressure also is transmitted to the said brake-cylinder port when applying the brakes for emergency stops, and a slide-valve traversing said seat and controlling the air passing through all three of said passages.

11. The combination, in valve mechanism for automatic air-brakes, of a slide-valve seat having a port which is in communication with the brake-cylinder, a passage leading to the said slide-valve seat and through which auxiliary-reservoir pressure is transmitted for graduating the brakes, a passage through which train-pipe pressure is transmitted to the said brake-cylinder port when applying the brakes for emergency stops, and a single slide-valve traversing the said valve-seat and controlling the said passages, for the purpose set forth.

12. The combination, in valve mechanism for automatic air-brakes, of a slide-valve seat having three ports, the first of which is in communication with the brake-cylinder and the second with the atmosphere, a graduating-passage leading to the third valve-seat port and through which auxiliary-reservoir air is transmitted to preliminarily apply the brakes, a single slide-valve traversing the said seat and controlling the graduating or preliminary application of the brakes and the release of the same, and a piston to actuate the said slide-valve and having a limited movement independent thereof.

In testimony whereof I affix my signature in the presence of two witnesses.

GEORGE A. BOYDEN.

Witnesses:
FRANK P. DAVIS,
JNO. T. MADDOX.